Patented July 27, 1948

2,445,799

UNITED STATES PATENT OFFICE 2,445,799

ORGANIC SULFUR-CONTAINING POLYMERS

Rupert C. Morris, Berkeley, and Edward C. Shokal, Oakland, Calif., assignors to Shell Development Company, San Francisco, Calif., a corporation of Delaware No Drawing. Application April 25, 1944, Serial No. 532,662

11 Claims. (Cl. 260—77.5)

This invention relates to the polymerization and co-polymerization of unsaturated esters of sulfolanyloxy-substituted carboxylic acids and to the resulting polymers and co-polymers.

The polymerization of unsaturated esters of polycarboxylic acids is known. As usually produced, however, many of the polymers are objectionably discolored. Further, when the polymerization is effected in the massive state, i. e. in the substantial absence of solvent or non-solvent diluents, the product often sticks to the mold so tenaciously that the product or the mold is broken in the process of separation.

We have now discovered that improved resins can be produced by the polymerization of unsaturated esters of sulfolanyloxy-substituted carboxylic acids. We have further discovered that resins from other polymerizable unsaturated compounds can be improved as to color and as to ease of release from the mold by the co-polymerization of the compounds with one or more unsaturated esters of sulfolanyloxy-substituted carboxylic acids. The polymerization and co-polymerization of these compounds to useful resins is surprising, since it has been generally accepted that sulfur and sulfur-containing compounds act as polymerization inhibitors or chain-breakers.

Accordingly, it is an object of the present invention to provide for the polymerization of polymerizable unsaturated esters of sulfolanyloxy-substituted carboxylic acids. Another object is to provide for the co-polymerization of unsaturated esters of sulfolanyloxy-substituted carboxylic acids with one or more other unsaturated compounds. Another object is to provide improved polymers and co-polymers. Another object is to provide internal mold lubricants for polymerizable unsaturated compounds. Other objects will be apparent from the description of the invention given hereinafter.

The new polymerizable compounds with which the invention is concerned are ethers of hydroxy-substituted sulfolanes with hydroxy carboxylic acids having a carboxyl group esterified by an unsaturated alcohol.

Suitable esterifying unsaturated alcohols are real or hypothetical compounds having an unsaturated linkage of aliphatic character between two carbon atoms, one of which is attached directly to a carbon atom which in turn is attached directly to an alcoholic hydroxyl group. These alcohols can be described also as compounds having an unsaturated linkage of aliphatic character between two carbon atoms at least one of which is not more than once removed from an alcoholic hydroxyl group.

One subgroup of unsaturated alcohols within the foregoing definition consists of compounds having an unsaturated linkage of aliphatic character between two carbon atoms, one of which is attached directly to an alcoholic hydroxyl group. These compounds are, thus, alpha-unsaturated alcohols. The most desirable alpha-unsaturated alcohols are vinyl-type alcohols, which are compounds having a double bond of aliphatic character between two carbon atoms, one of which is attached directly to an alcoholic hydroxyl group. Vinyl-type alcohols are alcohols of aliphatic character having an alpha-beta double bond. Vinyl-type alcohols have a structure which may be represented by the general formula

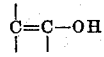

Of the vinyl-type alcohols a preferred subgroup consists of compounds having a terminal methylene group attached by an olefinic double bond to a carbinol carbon atom, as represented by the general formula $$CH_2=C-OH$$

Examples of preferred vinyl-type alcohols are vinyl alcohol, isopropenol, buten-1-ol-2, etc. Examples of other vinyl-type alcohols are propen-1-ol-1, buten-1-ol-1, cyclohexen-1-ol-1, and cyclopenten-1-ol-1, etc. Vinyl alcohol is the preferred specific alpha-unsaturated alcohol.

Another important subgroup of unsaturated alcohols consists of compounds having an unsaturated linkage of aliphatic character between two carbon atoms, one of which is attached directly to a saturated carbon atom which in turn is attached directly to an alcoholic hydroxyl group. These are the beta-unsaturated alcohols. The unsaturated carbon-to-carbon linkage may be a triple bond, as in propargyl alcohol, 2-methyl-butyn-3-ol-2, 2-methyl-hexyn-3-ol-2, octyn-2-ol-1, nonyn-2-ol-1, decyn-3-ol-2 and 2-methylnonyn-3-ol-2. More commonly, the unsaturated carbon-to-carbon linkage is a double bond. Compounds having a double bond of aliphatic character between two carbon atoms, one of which is attached directly to a saturated carbinol carbon atom are allyl-type alcohols. They have in the molecule a structure which can be represented by the general formula

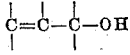

Preferred allyl-type alcohols have a terminal methylene group attached by a double bond to a carbon atom which is attached directly to a saturated carbinol carbon atom, as represented by the general structural formula

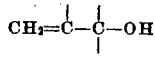

Further preferred are allyl-type alcohols of the latter formula wherein the carbinol carbon atom is primary or secondary, as represented by the formula

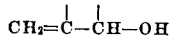

Representative examples of preferred allyl-type alcohols are the following: allyl alcohol, methallyl alcohol, ethallyl alcohol, chloroallyl alcohol, buten-1-ol-3, penten-1-ol-3, hexen-1-ol-3, 3-methyl-buten-1-ol-3, 3-methyl-penten-1-ol-3, 2-methyl-buten-1-ol-3, 2-methyl-penten-1-ol-3, 2,3-dimethyl-buten-1-ol-3, hepten-1-ol-3, 4-methyl-hexen-1-ol-3, 5-methyl-hexen-1-ol-3, 4,4'-dimethyl-penten-1-ol-3, octen-1-ol-3, 6-methyl-hepten-1-ol-3, 4-methyl-hepten-1-ol-3, 4,4'-dimethyl-hexen-1-ol-3, 3-phenyl-propen-1-ol-3, 3-tolyl-propen-1-ol-3, 3-xylyl-propen-1-ol-3, 4-phenyl-buten-1-ol-3, 4-tolyl-buten-1-ol-3, 4-xylyl-buten-1-ol-3, 3-naphthyl-propen-1-ol-3, 4-chloro-buten-1-ol-3, pentadien-1,4-ol-3, hexen-1-yn-5-ol-3, 2-methyl-penten-1-yn-4-ol-3, and 2,5-dimethyl-hexadien-1,5-ol-4. Other allyl-type alcohols are crotyl alcohol, tiglyl alcohol, 3-chloro-buten-2-ol-1, cinnamyl alcohol, hexadien-2,4-ol-1, hexadien-2,5-ol-1, butadien-2,3-ol-1, hexadien-3,5-ol-2, 2-methyl-hexen-2-ol-1, 2-methyl-penten-2-ol-1, 3,7-dimethyl-octadien-2,7-ol-1, cyclopenten-2-ol-1, cyclohexen-2-ol-1, etc.

The unsaturated alcohols whose radicals constitute part of the esters of the present invention preferably have no more than about 18 carbon atoms in the molecule and have at least one unsaturated carbon-to-carbon linkage for each 6 carbon atoms. The alcohols themselves need not be capable of separate existence. It is essential only that the compounds of the invention containing the alcohol radicals be stable.

Hydroxy carboxylic acids whose radicals may constitute part of the polymerizable compounds with which the invention is concerned may be saturated or unsaturated, open chain aliphatic, cycloaliphatic or aromatic in character, and may contain one or a plurality of hydroxyl groups and one or a plurality of carboxyl groups. All of the hydroxy groups of polyhydroxy acids may be etherified with the same or different sulfolanyl radical, or less than all of the hydroxy groups may be so etherified, the remaining hydroxyl group or groups being unetherified or etherified by one or more other radicals. In the case of polycarboxylic acids all of the carboxyl groups may be esterified by the same or different unsaturated alcohol, as hereinbefore described, or less than all of the carboxyl groups may be so esterified, the remaining carboxyl group or groups being unesterified or esterified by one or more other radicals, e. g. saturated organic radicals. Compounds containing metal or alkali metal salt groups can be used. Preferred compounds are substantially free from unreacted carboxyl groups.

The most desirable hydroxy carboxylic acids for the purposes of the present invention are saturated aliphatic compounds having but a single hydroxyl group and but a single carboxyl group, said two groups being adjacent or separated from one another by a chain of from one to about four carbon atoms, which chain may contain substituents. Representative examples of such acids are hydroxy formic, glycolic, lactic, beta-hydroxy propionic, alpha-hydroxy isobutyric, beta-hydroxy isobutyric, etc., acids.

Representative examples of other suitable hydroxy carboxylic acids are hydroxy malonic, monohydroxy succinic, alpha-monohydroxy glutaric, beta- monohydroxy glutaric, alpha-alpha'-dihydroxy succinic, alpha,beta-dihydroxy propionic, etc. acids.

The compounds of the invention are ethers of the hereinbefore designated hydroxy acid esters with hydroxy-substituted sulfolanes. The term "sulfolane" refers to thiolane-1,1-dioxide which is cyclotetramethylenesulfone. The term "sulfolanol" refers generically to sulfolanes in which at least one ring hydrogen atom has been replaced by an hydroxyl group, and specifically to sulfolanes in which just one ring hydrogen atom has been replaced by one hydroxyl group. The term "sulfandiol" refers specifically to sulfolanes in which two ring hydrogen atoms have been replaced by hydroxyl groups.

The most easily produced sulfolanols have but a single ring-attached hydroxyl group which occurs in the 3, or beta, position on the ring and such sulfolanols are herein preferred. Mono hydroxy sulfolanes may, however, have the hydroxyl group attached to any of the other ring carbon atoms. Dihydroxy sulfolanes preferably have the two hydroxyl groups in the 3,4 or in the 2,3 positions on the ring. Compounds in accordance with the invention from poly hydroxy-substituted sulfolanes may have all of the ring-attached hydroxyl groups etherified with the hydroxyl groups of one or more hydroxy acid esters of unsaturated alcohols, or less than all of the hydroxyl groups of the hydroxy sulfolane may be so etherified, the remaining hydroxyl group or groups being unetherified or etherified by one or more other radicals.

The compounds of the invention may be represented by the general formula

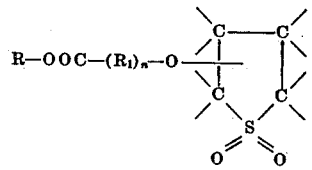

wherein R is a polymerizable unsaturated monovalent radical of an unsaturated alcohol, as hereinbefore designated, $R_1$ is a divalent organic radical, preferably a divalent hydrocarbon radical, which may or may not be substituted by halogen, hydroxy, alkoxy or like groups, and n is a small whole number, i. e. a lower member of the series 0, 1, 2, 3 . . .

The free valences of the sulfone ring not satisfied by the indicated radical may be satisfied with hydrogen or with the same or different organic radicals such as methyl, ethyl, propyl, isopropyl, normal butyl, isobutyl, secondary butyl, tertiary butyl, normal pentyl, isopentyl, secondary pentyl, hexyl, normal octyl, iso-octyl, normal decyl, isodecyl, dodecyl, tetradecyl, cetyl, stearyl, trimethyl octadecyl, allyl, methallyl, crotyl, methyl vinyl carbinyl, butenyl, pentenyl, hexenyl, propargyl, geranyl, oleyl, phenyl, naphthyl, anthryl, tolyl, xylyl, secondary butyl-naphthyl, dipropyl-naphthyl, benzyl, naphthyl-butyl, phenethyl, vinyl-phenyl, crotonyl-naphthyl, methallyl-phenyl, triallyl-naphthyl, naphthylallyl, 2- phenyl-ethenyl, phenyl vinyl carbinyl, cinnamyl, acetyl, propionyl, caproyl, stearacyl, benzoyl, cyclopentyl, ethyl-cyclohexyl, tributyl-cyclohexyl, cyclopentenyl, cyclohexenyl, vinyl cyclohexenyl, thioenyl, pyrrolyl, pyridyl, furyl, butyl carbothionyl, octyl carbothionyl, decyl carbothionyl, etc. Further, these radicals may be substituted with other elements or groups as halogen, hydroxyl, amino, nitro, carbonyl, sulfo, cyano, etc. For example, such substituted radicals may be chlorobutyl, bromo-octyl, nitroethyl, hydroxycyclohexyl, nitrobenzyl, chlorallyl, chlorobenzoyl, tetrahydrofurfuryl, hydroxyethyl, dihydro-isophoryl, sulfo-ethyl, benzene sulfonyl, cyanoacetyl, etc.

Examples of divalent hydrocarbon radicals are methylene, ethylene, ethylidene, tetramethylene, butylidene, methyl ethylene, ethyl ethylene, pentamethylene, amylidene, methyl butylene, ethyl propylene, propyl ethylene, hexylene, decamethylene, cyclopentylene, cyclohexylene, phenylene, etc. The radicals may be saturated or unsaturated and may be open chain aliphatic, cycloaliphatic or aromatic. Preferred are saturated open chain aliphatic radicals.

Preferred compounds in accordance with the invention are functional derivatives of 3-sulfolanol as represented by the general formula

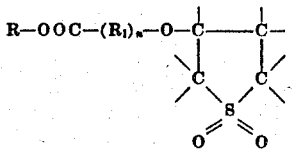

wherein R is a polymerizable unsaturated monovalent radical of an unsaturated alcohol as hereinbefore designated, $R_1$ is a divalent organic radical, preferably a divalent hydrocarbon radical, which may or may not be substituted by halogen, hydroxy, alkoxy or like groups, and $n$ is a small whole number, i. e. a lower member of the series 0, 1, 2, 3 . . . The free valences of the sulfone ring are preferably satisfied by hydrogen or by lower hydrocarbon radicals such as methyl, ethyl, etc. Examples of such compounds are vinyl 3-sulfolanyl carbonate, isopropenyl 3-sulfolanyl carbonate, allyl 3-sulfolanyl carbonate, methallyl 3-sulfolanyl carbonate, chloroallyl 3-sulfolanyl carbonate, crotyl 3-sulfolanyl carbonate, propargyl 3-sulfolanyl carbonate, vinyl 3-sulfolanyloxy acetate, allyl 3-sulfolanyloxy acetate, methylallyl 3-sulfolanyloxy acetate, vinyl alpha (3-sulfolanyloxy) propionate, allyl alpha (3-sulfolanyloxy) propionate, methallyl alpha (3-sulfolanyloxy) propionate, vinyl beta (3-sulfolanyloxy) propionate, allyl beta (3-sulfolanyloxy) propionate, vinyl alpha (3-sulfolanyloxy) butyrate, allyl alpha (3-sulfolanyloxy) butyrate, vinyl beta (3-sulfolanyloxy) butyrate, allyl beta (3-sulfolanyloxy) butyrate, allyl alpha (3-sulfolanyloxy) isobutyrate.

Another group of suitable compounds consists of functional derivatives of 3,4-dihydroxy-sulfolane in which both of the ring-attached hydroxyl groups are etherified by the hydroxyls of hydroxy carboxylic acid esters of unsaturated alcohols. Compounds in this group may be represented by the general formula

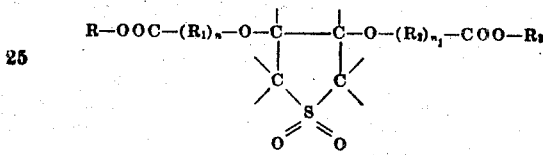

wherein R and $R_3$ are the same or different polymerizable unsaturated monovalent radicals of unsaturated alcohols, as hereinbefore designated, $R_1$ and $R_2$ are the same or different divalent organic radicals, preferably the same or different hydrocarbon radicals, either or both of which may or may not be substituted by halogen, hydroxy, alkoxy or like groups, and $n$ and $n_1$ are the same or different small whole numbers, e. g. members of the series 0, 1, 2, 3 . . . The free valences of the sulfone ring are preferably satisfied by hydrogen or lower hydrocarbon radicals. Examples of compounds in this group are those having the following formulas:

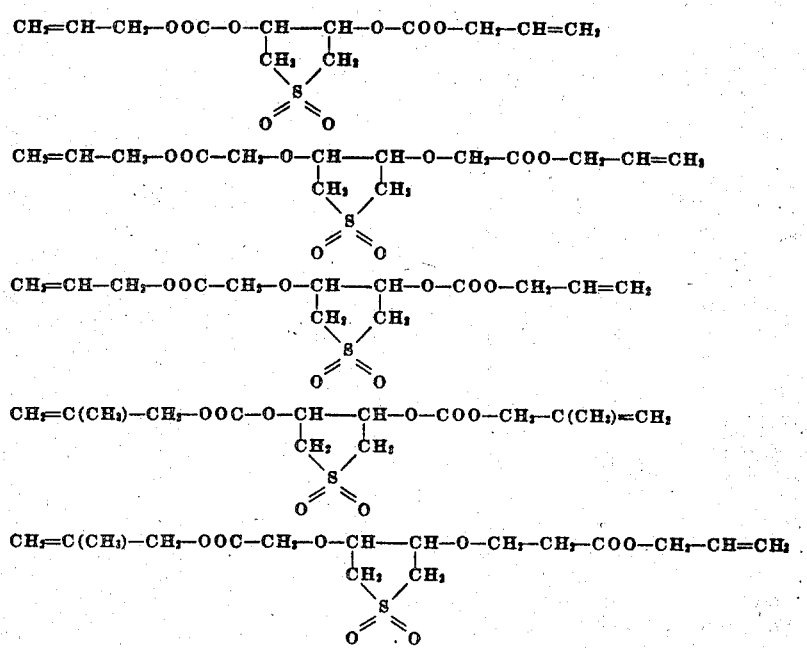

Another group of suitable compounds consists of functional derivatives of 2,3-dihydroxy sulfolane in which both of the ring-attached hydroxyl groups are etherified by hydroxyls of hydroxy carboxylic acid esters of unsaturated alcohols. Compounds in this group may be represented by the general formula:

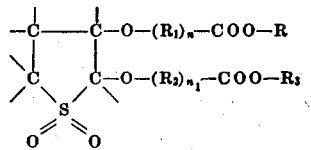

wherein R and $R_3$ are the same or different polymerizable unsaturated monovalent radicals of unsaturated alcohols, as hereinbefore designated, $R_1$ and $R_2$ are the same or different divalent organic radicals, preferably the same or different divalent hydrocarbon radicals, either or both of which may or may not be substituted by halogen, hydroxy, alkoxy or like groups, and $n$ and $n_1$ are the same or different small whole numbers, i. e. members of the series 0, 1, 2, 3 . . . The free valences of the sulfone ring are preferably satisfied by hydrogen or by lower hydrocarbon radicals. Examples of compounds in this group are those represented by the following formulas:

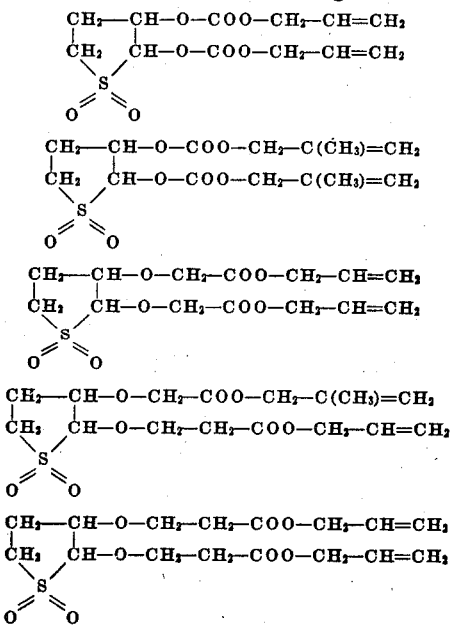

The sulfolanyloxy compounds of the invention can be produced by numerous methods of synthesis. One method comprises first producing the sulfolanyloxy acid and subsequently esterifying. The sulfolanyloxy acid can be produced by reacting the hydroxy sulfolane upon a halogen-substituted acid. For instance, 3-sulfolanol can be reacted with chloroacetic acid to form sulfolanyloxy acetic acid. In some cases it may be preferred to react a metal or an alkali metal derivative of the hydroxy sulfolane upon the halogen-substituted acid. Instead of the halogen-substituted acid itself a derivative thereof may be used as a reactant. For instance, sulfolanyloxy formic acid may be produced by reacting 3-sulfolanol with phosgene followed by the conversion of the resulting sulfolanyloxy formyl chloride to the acid by known methods.

The sulfolanyloxy-substituted acids or derivatives thereof can be esterified with unsaturated alcohols by known or special methods. In some cases the esterification can be performed directly by reacting the acid with the alcohol, preferably in the presence of an esterification catalyst such as an alkali metal alcoholate, a strong mineral acid or the like. In other cases it is preferred to react an alkali metal derivative of the acid with the alcohol or with a halide of the alcohol or with an ester of the alcohol with a low-boiling acid. Another method comprises reacting the free acid upon an ester of the alcohol with a low-boiling acid, preferably in the presence of a catalyst such as mercuric sulfate. Another method comprises ester-exchange involving an ester of the sulfolanyloxy-substituted acid with a lower alcohol, e. g. a lower saturated aliphatic alcohol and an ester of the unsaturated alcohol with a lower acid, e. g. a lower saturated aliphatic acid, the reaction being preferably conducted in the presence of an esterification catalyst.

Another method of producing the sulfolanyloxy compounds of the invention comprises first producing an unsaturated ester of a suitably substituted acid, e. g. a hydroxy-substituted, an alkali metalloxy-substituted or a halogen-substituted acid and subsequently converting the compound to the corresponding sulfolanyloxy-substituted compound. The unsaturated esters of substituted acids can be produced by the direct esterification of the acid with the alcohol, by ester-exchange, by acid-exchange or by ester-interchange, in accordance with one or more of the above-disclosed processes or by other methods. The esters of the hydroxy-substituted acids may be etherified with hydroxy sulfolanes or functional derivatives thereof. Unsaturated esters of halogen-substituted acids can be reacted directly with hydroxy sulfolanes.

Compounds in accordance with the invention having a vinyl ester group can be produced by reacting the sulfolanyloxy-substituted acid with acetylene in the presence of a mercuric salt such as mercuric sulfate.

The compounds of the invention may be produced by the dehydration, dehydrohalogenation or dehalogenation of suitable saturated compounds. For instance, disodium glycolate can be reacted with ethylene chlorohydrin to form the ethylene glycol ester of sodium oxy-substituted acetic acid, followed by dehydration to the corresponding vinyl ester and subsequently by etherification.

Compounds having both vinyl-type and allyl-type ester groups may be produced by reacting the allyl-type acid ester with a vinyl-type ester, e. g. vinyl acetate, in the presence of a mercuric salt, such as mercuric acetate. Alternatively the acid ester may be acted upon with acetylene; or an ester-exchange process may be used.

3-sulfolanol can be produced by the action of water upon 3-sulfolene (which is 3-thiolene-1,1-dioxide or beta-butadiene sulfone), or upon 2-sulfolene (which is 2-thiolene-1,1-dioxide or alpha-butadiene sulfone). The preparation of poly-hydroxy-substituted sulfolanes can be carried out by action upon the sulfolenes in accordance with known or special procedures. The preparation of the sulfolenes is described in part in British Patent 361,341; German Patent 236,386; German Patent 506,839; and by Backer and Strating, In Rec. trav. chim. 53, 525–543 (1934).

Other methods of producing the compounds of the invention can be used.

Catalysts other than those named herein may be employed. Those catalysts and conditions which have been found to apply to esterification, etherification, etc. reactions in general can be applied to the production of the compounds of the present invention. Polymerization inhibitors may be required. Tannic acid is an effective inhibitor in reactions involving vinyl ester groups, although other inhibitors are satisfactory.

The new compounds have many uses. They act as plasticizers and tackifiers for plastics and elastomers. They are starting materials for numerous chemical syntheses. They can be used as textile assistants. The polymers of the compounds are of particular value, as more fully pointed out hereinbelow.

A single sulfolanyloxy-substituted acid ester can be polymerized alone or two or more such esters can be polymerized in admixture with one another. The compounds can be polymerized in the presence of other polymerizable compounds containing one or more unsaturated carbon-to-carbon linkages.

Typical co-polymerizable compounds are those containing in the molecule a single polymerizable olefinic linkage such as styrene, vinyl halides, vinylidene halides, vinyl esters of saturated monocarboxylic acids, methyl acrylate, methyl methacrylate, allyl halides, allyl esters of saturated monocarboxylic acids, etc. Another important group consists of unconjugated polymerizable compounds having in the molecule two or more non-conjugated polymerizable unsaturated linkages such as unsaturated aliphatic polyesters of saturated polybasic acids, polyesters of saturated polyhydric alcohols with unsaturated organic acids, and esters of unsaturated alcohols with unsaturated aliphatic acids. Other polymerizable unsaturated compounds are those containing in the molecule one or more polymerizable organic radicals and one or more inorganic radicals or elements as exemplified by the vinyl, allyl and methallyl esters of phosphoric acid and of the ortho acids of silicon, boron, etc. Another important group of co-polymerizable compounds consists of those having in the molecule two or more, preferably two, conjugated unsaturated polymerizable carbon-to-carbon linkages such as conjugated butadiene, conjugated chlorobutadiene, isoprene, the other conjugated pentadienes, the conjugated hexadienes, their homologues, analogues and suitable substitution products. Particularly valuable co-polymers are those of the compounds of the invention with one or more allyl-type polyesters of polycarboxylic acids, particularly allyl-type polyesters of aromatic polycarboxylic acids, e. g. diallyl phthalate and the like. Other valuable co-polymers of the preferred class are those with allyl-type polyesters of ethereal oxygen-containing polycarboxylic acids, e. g. diallyl diglycolate.

The compounds of the invention can be polymerized and co-polymerized by oxygen-containing polymerization catalysts. Benzoyl peroxide has been found satisfactory for this purpose. Other polymerization catalysts are acetyl peroxide, benzoyl acetyl peroxide, lauryl peroxide, dibutyryl peroxide, succinyl peroxide, sodium peroxide, barium peroxide, tertiary alkyl hydroperoxides, such as tertiary butyl hydroperoxide, peracetic acid, perphthalic acid, perborates, persulfates, ozone and oxygen. The compounds can be polymerized in the presence of their own peroxides, or of their ozonides. Another class of polymerization catalysts consists of the di(tertiary alkyl) peroxides, notably di(tertiary butyl) peroxide, as described and claimed in the co-pending application of Vaughan and Rust, Serial Number 481,052, filed March 29, 1943, now Patent No. 2,426,476 which is a continuation-in-part of their co-pending application Serial Number 474,224, filed January 30, 1943 now Patent No. 2,395,523. Metals and metallic salts may be used as polymerization catalysts. If desired, mixtures of polymerization catalysts can be used, a suitable mixture being that of benzoyl peroxide and hydrogen peroxide. In some cases it may be desirable to conduct the polymerization in the concurrent presence of both a catalyst and an inhibitor of polymerization. The amount of peroxide catalyst used will ordinarily be between about 0.01% and about 5%, although it is not necessarily limited to this range. In still other cases it may be unnecessary to use any catalyst at all.

Polymerization is usually energized by the application of heat, although both heat and light may be used, and in some cases, light may be sufficient. Temperatures between about 60° C. and about 150° C. are preferred, although higher and lower temperatures can be used. The monomeric compounds can be polymerized in the massive state or as dispersions or solutions. Where the dispersion method is employed, it may be desirable to select a dispersing medium insoluble in the catalyst involved. With certain compounds polymerization can be effected in vapor state. Continuous or discontinuous processes may be used. Atmospheric, reduced, or superatmospheric pressures may be used. Polymerization may be carried out under a blanket of an inert gas.

The polymerization reaction can be carried to completion without substantial interruption or it can be stopped at any point short of completion. Incomplete polymerization may be used for the production of a syrup comprising a mixture of monomer and polymer which may be further worked and eventually substantially completely polymerized. The syrup may, for instance, be transferred to a mold of any desired configuration and again subjected to polymerization conditions, or it may be used in coating operations, or in impregnating bibulous, e. g. fibrous, material, which in turn may be used in the production of laminates. Unreacted monomer may be separated from its mixture with polymer by solvent extraction, distillation or other methods. The separated polymer may then be worked up in any known or special manner. In the case of many compounds, particularly in the case of the polymerization of compounds having two or more non-conjugated polymerizable unsaturated linkages in the molecule, the separated polymer may be capable of further polymerization. Such compounds can be rendered infusible and insoluble in common non-reactive solvents.

Polymers and co-polymers of the invention can be modified by admixture with other synthetic resins, natural resins, cellulose derivatives, and drying oils. Preferred modifiers are film-forming substances. Examples of synthetic resins in addition to polymers of the polymerizable unsaturated organic compounds illustrated hereinabove are alkyd resins, urea-aldehyde resins, phenol-aldehyde resins and synthetic linear super-polyamides and polyester-amides. There may also be present one or more plasticizers, stabilizers, lubricants, dyes, pigments, or fillers. Where the modifiers do not react with, or otherwise adversely affect, the ingredients of the reaction mixture, they may be added to the monomer or to the partially polymerized material. Where the modifiers are not added to the monomer, they can be incorporated with preformed polymer by grinding, mixing or milling on heated rolls, or by co-precipitation from a common solvent.

Polymers and co-polymers can be produced in accordance with the invention which are characterized by excellent resistance to the action of physical and chemical agents. Resins can be produced which are clear, water-white, hard and infusible. Many of the polymers possess film-forming properties and adhere well to metal and to many other kinds of surfaces. They can be used as the basis for valuable coating compositions. Some of the solid resinous products of the invention can be used as glass substitutes. Massive castings can be subjected to machine operations. Many of the resins can be used in extrusion, injection molding and compression molding processes.

One of the outstanding advantages of the sulfolanyloxy-substituted acid esters of the invention is their ability to reduce color formation in the polymerization of other polymerizable unsaturated compounds in the presence of peroxide catalysts. It has been found that relatively very small amounts of these esters as co-polymers are so effective.

Some of the many ways in which the invention can be practiced are illustrated by the following examples in which parts are on a weight basis.

Example I 3-sulfolanol was produced by the addition of water to beta-butadiene sulfone in the presence of potassium hydroxide in accordance with the following procedure.

A solution of beta-butadiene sulfone, 472 g., in 4.5 liters of 2 N potassium hydroxide was allowed to stand for 20 hours at between 20° C. and 30° C. The solution was then neutralized with hydrochloric acid and evaporated to dryness. The residue was extracted with acetone. The acetone was removed from the extract by evaporation. The unreacted sulfone in the extract was cracked and the products volatilized. The 3-sulfolanol was purified by fractional distillation.

To a solution of 136 g. of 3-sulfolanol, 580 g. of chloroform and 86 g. of pyridine was added slowly with stirring a solution of 120.5 g. of allyl chlorocarbonate in 174 g. of chloroform. The reaction mixture was kept at 2° C.–4° C. during the addition, then allowed to warm to room temperature. The reaction mixture was washed with distilled water and concentrated under reduced pressure. The residue solidified on standing. It crystallized from isopropyl alcohol in small white plates melting at between 63.5° C. and 65° C. The product was substantially pure allyl 3-sulfolanyl carbonate.

Example II

Allyl 3-sulfolanyl carbonate obtained in accordance with the procedure outlined in Example I was mixed with 5 parts of benzoyl peroxide per 100 parts of the carbonate. The mixture was placed in a glass vessel, which was then sealed and maintained at 60° C.–65° C. for 15.5 hours. The resulting polymer was hard and insoluble in acetone.

Example III

A mixture of allyl 3-sulfolanyl carbonate, 8 parts, diallyl phthalate, 92 parts, and benzoyl peroxide, 2 parts, was heated in a sealed glass vessel at 65° C. for 144 hours. A hard resin was obtained which had an impact strength of 22 kg./sq. cm., an impact bending strength of 940 kg./cm.² and a static bending angle of 10°. The resin could be removed from the mold much more easily than a homopolymer of diallyl phthalate prepared under identical conditions. The copolymer was considerably lighter in color than the homopolymer of diallyl phthalate.

Example IV

A mixture of allyl 3-sulfolanyl carbonate, 5 parts, diallyl phthalate, 95 parts, and benzoyl peroxide, 2 parts, was polymerized in a sealed glass mold by being maintained at 65° C. for 144 hours. A light-colored resin was obtained which was easily removed from the mold.

Example V

A mixture of allyl 3-sulfolanyl carbonate, 10 parts, diallyl diglycolate, 90 parts, and benzoyl peroxide, 2 parts, is polymerized by being maintained at 65° C. for 72 hours followed by 90° C. for an additional 72 hours. A hard light-colored transparent resin is obtained.

Example VI

Methallyl 3-sulfolanyl carbonate is produced by reacting methallyl chloroformate with 3-sulfolanol in accordance with the procedure described in Example I. A solution is prepared consisting of methallyl 3-sulfolanyl carbonate, 5 parts, diallyl phthalate, 95 parts, and benzoyl peroxide, 1 part. The solution is held at 65° C. for 200 hours. The resulting resin is very slightly yellow, clear and transparent.

Example VII

Allyl 3-sulfolanyl carbonate, 5 parts, is co-polymerized with methallyl 3-sulfolanyl carbonate, 5 parts, and diallyl phthalate, 90 parts, in the presence of benzoyl peroxide, 2 parts, the solution being maintained at 65° C. for 144 hours.

The term "unsaturated" as used herein refers to aliphatic-type carbon-to-carbon unsaturation. The term "polymerization" refers to polymerization through unsaturated carbon-to-carbon linkages.

We claim as our invention:

1. A homopolymer of an ester of tetrahydrothiophene-3-ol-1,1-dioxide with an acid carbonate of an aliphatic, monohydric, mono-olefinic alcohol having an olefinic double bond between two carbon atoms, one of which is directly attached to a saturated carbon atom which in turn is directly attached to the hydroxyl group.

2. A homopolymer of an ester of tetrahydrothiophene-3-ol-1,1-dioxide and an acid carbonate wherein the hydrogen atom of the carboxyl group is replaced by an aliphatic hydrocarbon radical which is directly attached to an oxygen atom of said carboxyl group by a carbon atom which is also directly linked to an olefinic carbon atom.

3. A polymer of an ester of the formula

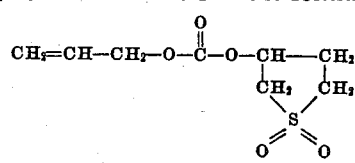

4. A polymer of an ester of tetrahydrothiophene-3-ol-1,1-dioxide with an alkenyl acid carbonate wherein the alkenyl radical contains an olefinic linkage between the second and third carbon atoms from the carbonate radical.

5. A polymer of an ester of tetrahydrothiophene-3-ol-1,1-dioxide with an alkenyl acid carbonate wherein the alkenyl radical contains an olefinic linkage between the second carbon atom from the carbonate radical and an adjacent carbon atom.

6. A polymer of an allyl ester of an aliphatic, saturated monocarboxylic acid having a carbon atom directly linked by an oxygen atom to a tetrahydrothienyl-1,1-dioxide radical.

7. A polymer of an allyl ester of a monocarboxylic acid having a carbon atom directly linked by an oxygen atom to a nuclear carbon atom of a tetrahydrothienyl-1,1-dioxide radical.

8. A polymer of an ester of an aliphatic, monohydric, mono-olefinic alcohol having an olefinic double bond between two carbon atoms, one of which is directly attached to a saturated carbon atom which in turn is directly attached to the hydroxyl group and a hydroxy carboxylic acid wherein the hydrogen atom of the non-carboxylic hydroxy group has been replaced by a tetrahydrothienyl-1,1-dioxide radical, said tetrahydrothienyl radical being directly linked to the oxygen atom of the carboxylic acid by one of said nuclear carbon atoms.

9. A polymer of an ester of a monocarboxylic acid having a carbon atom directly linked by an oxygen atom to a nuclear carbon atom of a tetrahydrothienyl-1,1-dioxide radical, wherein the hydrogen atom of the carboxyl group of said acid is replaced by a hydrocarbon radical having an unsaturated linkage between two carbon atoms of an aliphatic group, one of which carbon atoms is directly attached to a carbon atom which is also directly linked to an oxygen atom of said carboxyl group.

10. A copolymer of an ester of carbonic acid having the formula

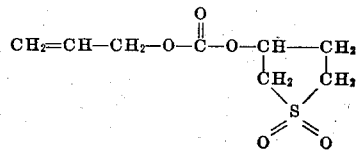

with diallyl phthalate wherein the ratio of said esters is 5 parts of said ester of carbonic acid to 95 parts of diallyl phthalate.

11. A process of producing a resin which comprises heating an ester of a hydroxy carboxylic acid wherein the hydrogen atom of a non-carboxylic hydroxy group has been replaced by a tetrahydrothienyl-1,1-dioxide radical, said tetrahydrothienyl radical being directly linked to the oxygen atom of the carboxylic acid by one of said nuclear carbon atoms and a hydrogen atom of a carboxyl group of said acid is replaced by a hydrocarbon radical having an unsaturated linkage between two carbon atoms of an aliphatic group, one of which carbon atoms is directly attached to a carbon atom which is also directly linked to an oxygen atom of said carboxyl group at a temperature between 60° C. and 150° C. in the presence of a peroxide polymerization catalyst.

RUPERT C. MORRIS.
EDWARD C. SHOKAL.

REFERENCES CITED

The following references are of record in the file of this patent:

UNITED STATES PATENTS

| Number | Name | Date |
|---|---|---|
| 2,219,006 | Delfs | Oct. 22, 1940 |

OTHER REFERENCES

Backer et al., article in Recueil des Travaux des Chimique des Pays Bas, 53, 525-543 (1934).

Shriner and Fuson, Identification of Organic Compounds, Wiley, N. Y., 1940, pages 41 and 43.